(12) United States Patent
Pan (10) Patent No.: US 7,979,066 B2
(45) Date of Patent: Jul. 12, 2011

(54) MULTIPLE IMSI CONNECTIONS

(75) Inventor: Shaowei Pan, Kildeer, IL (US)

(73) Assignee: Lemko Corporation, Schaumburg, IL (US)

( * ) Notice: Subject to any disclaimer, the term of this patent is extended or adjusted under 35 U.S.C. 154(b) by 439 days.

(21) Appl. No.: 12/238,269

(22) Filed: Sep. 25, 2008

(65) Prior Publication Data

US 2010/0075668 A1   Mar. 25, 2010

(51) Int. Cl.
*H04W 4/00* (2009.01)
(52) U.S. Cl. .................... 455/432.1; 455/433; 370/352; 370/356
(58) Field of Classification Search .................. None
See application file for complete search history.

(56) References Cited

U.S. PATENT DOCUMENTS

| 7,133,670 | B1 * | 11/2006 | Moll et al. ................. 455/432.1 |
| 2005/0070278 | A1 | 3/2005 | Jiang |
| 2005/0075106 | A1 * | 4/2005 | Jiang ......................... 455/432.3 |
| 2006/0141984 | A1 * | 6/2006 | Taglienti et al. ............. 455/406 |
| 2006/0142011 | A1 | 6/2006 | Kallio |
| 2007/0213075 | A1 * | 9/2007 | Jiang ............................ 455/461 |
| 2007/0232267 | A1 | 10/2007 | Pan |
| 2009/0227230 | A1 * | 9/2009 | Camilleri et al. ............. 455/408 |
| 2010/0048197 | A1 * | 2/2010 | Jiang ......................... 455/422.1 |
| 2010/0048208 | A9 * | 2/2010 | Gunaratnam et al. ..... 455/435.2 |

FOREIGN PATENT DOCUMENTS

WO   2007102003 A1   9/2007

OTHER PUBLICATIONS

The International Search Report and the Written Opinion for International Application No. PCT/US2009/050522 received from the International Searching Authority (ISA/KR) mailed Feb. 1, 2011, 9 pages.

* cited by examiner

*Primary Examiner* — Ajit Patel
(74) *Attorney, Agent, or Firm* — Toler Law Group, IP (57) ABSTRACT

A system is disclosed that includes a first multiple International Mobile Subscriber Identity (IMSI) location register (MILR) module. The first MILR module includes user information associated with a plurality of mobile subscribers. For each of the mobile subscribers, the user information includes a first IMSI number and a first Mobile Directory Number (MDN). The first IMSI number and the first MDN are associated with a first country. The user information includes a second IMSI number and a second MDN. The second IMSI number and the second MDN are associated with a second country. The user information also includes active location information for each of the mobile subscribers.

21 Claims, 8 Drawing Sheets

MULTIPLE IMSI CONNECTIONS

FIELD OF THE DISCLOSURE

The present disclosure relates generally to multiple International Mobile Subscriber Identity (IMSI) connections.

BACKGROUND

An International Mobile Subscriber Identity (IMSI) number enables international roaming of cellular phones. Each IMSI number includes a first set of digits associated with a mobile country code, a second set of digits associated with a mobile network code, and a third set of digits associated with a wireless carrier of a particular country. International roaming often involves a wireless carrier from a roaming country communicating data to a wireless carrier of a home country for authentication of mobile subscriber information. After authentication, a roaming device can receive incoming calls and make outgoing calls. However, calls to the roaming device are charged at international roaming rates, resulting in expensive calls.

DETAILED DESCRIPTION

In a particular illustrative embodiment, a method of routing telephone calls from a first country to a second country via an Internet Protocol (IP) network is disclosed. The method includes receiving a telephone call directed to a first Mobile Directory Number (MDN) in a first country. When the mobile subscriber associated with the first MDN is located in a second country, the method includes routing the telephone call to the second country via the IP network.

In another illustrative embodiment, a system includes a first home location register (HLR) module, a first visitor location register (VLR) module, and a first community location register (CLR) module. The system includes a first multiple International Mobile Subscriber Identity (IMSI) location register (MILR) module. The first MILR module includes user information associated with a plurality of mobile subscribers. For each of the mobile subscribers, the user information includes a first IMSI number and a first Mobile Directory Number (MDN) associated with a first country. The user information includes a second IMSI number and a second MDN associated with a second country. The user information also includes active location information for each of the mobile subscribers.

Figure 1:
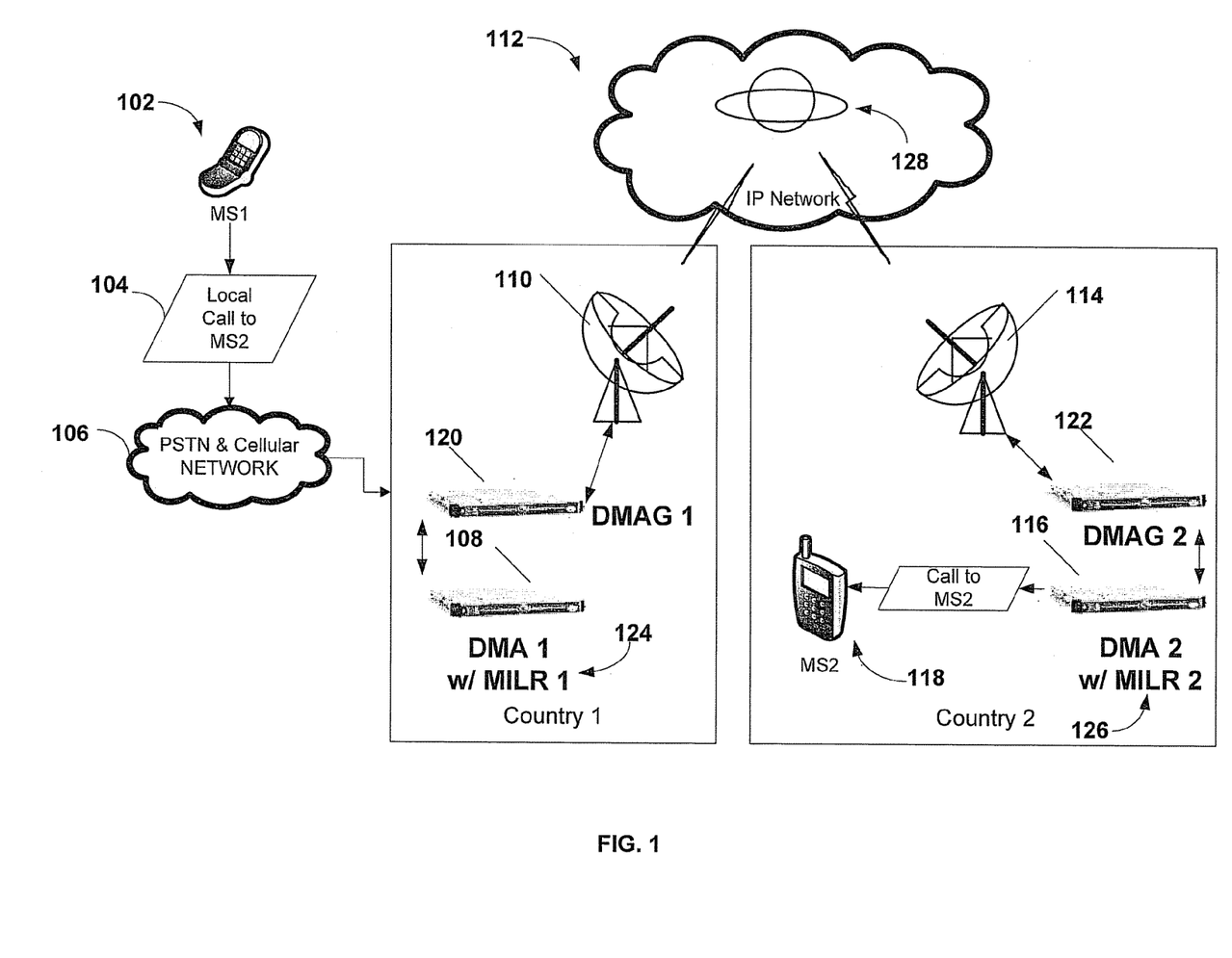
FIG. 1 is a diagram of a system used to route telephone calls from a first country to a second country via an Internet Protocol network.

FIG. 1 illustrates a system that may be used to route telephone calls from a first country to a second country via an Internet Protocol (IP) network 112. In the particular embodiment illustrated in FIG. 1, the IP network 112 includes a satellite link 128 (or microware) between the first country and the second country. In alternative embodiments, the IP network 112 includes a wired link (under ground fiber optical cable or under sea optical cable) between the first country and the second country. The system includes a first distributed mobile architecture server 108 located in the first country and a second distributed mobile architecture server 116 located in the second country. The first distributed mobile architecture server 108 located in the first country is linked to the second distributed mobile architecture server 116 in the second country via the IP network 112. In the particular embodiment illustrated in FIG. 1, both the first distributed mobile architecture server 108 located in the first country and the second distributed mobile architecture server 116 located in the second country may be connected to one or more distributed mobile architecture gateways (DMAGs) 120 and 122, providing an interface between the distributed mobile architecture servers and multiple networks.

The system may be used to receive a telephone call directed to a first Mobile Directory Number (MDN) from a first mobile subscriber 102 located in the first country. In a particular embodiment, the first MDN is a local telephone number in the first country. Thus, the first mobile subscriber 102 may make a local call 104 to a second mobile subscriber 118. The local call 104 from the first mobile subscriber 102 may be received via an existing Public Switched Telephone Network (PSTN) or via an existing cellular network 106.

When the mobile subscriber associated with the first MDN is located in the first country, a telephone call to the first MDN received from a caller in the second country is routed to the first MDN via the IP network 112. In the example shown in FIG. 1, the second mobile subscriber 118 is located in the second country.

The local call 104 is received at a first distributed mobile architecture server 108 located in the first country. The first distributed mobile architecture server 108 includes a first multiple International Mobile Subscriber Identity (IMSI) location register (MILR) module 124. The first MILR module 124 includes user information associated with a plurality of mobile subscribers. For each of the mobile subscribers, the user information includes a first IMSI number and a first Mobile Directory Number (MDN) associated with the first country. The first MILR module 124 also includes user information associated with a second IMSI number and a second MDN associated with the second country. The first MILR module 124 may also include user information associated with other IMSI numbers and MDNs associated with other countries. The first MILR module also includes active location information related to each mobile subscriber. The active location information records information related to a current location of a particular mobile subscriber. In a particular embodiment, the first distributed mobile architecture server 108 also includes a first home location register (HLR) module, a first visitor location register (VLR) module, and a first community location register (CLR) module.

The local call 104 received at the first distributed mobile architecture server 108 may be routed to the second country via the IP network 112, which may include a satellite link 128 between the first country and the second country. In alternative embodiments, the IP network 112 may include another wireless link or a wired link between the first country and the second country. In the embodiment shown in FIG. 1, the first distributed mobile architecture server 108 transmits the local call 104 over the IP network 112 via a first transceiver 110. The local call 104 is transmitted to a satellite 128 which retransmits the local call 104 to a second transceiver 114 located in the second country. The second transceiver 114 is associated with a second distributed mobile architecture server 116 that includes a second MILR module 126. The second MILR module 126 includes user information associated with one or more IMSI numbers and one or more MDNs associated with multiple countries. The second MILR module 126 also includes active location information related to each mobile subscriber. In a particular embodiment, the second MILR module 126 also includes a second HLR module, a second VLR module, and a second CLR module.

Upon receiving the local call 104 via the IP network 112 at the second transceiver 114, the second distributed mobile architecture server 116 routes the local call 104 to the second mobile subscriber 118 located in the second country. Thus, a telephone call to the first MDN from the first mobile subscriber 102 located in the first country is routed to the second MDN via the IP network when the second mobile subscriber 118 is located in the second country.

Figure 2:
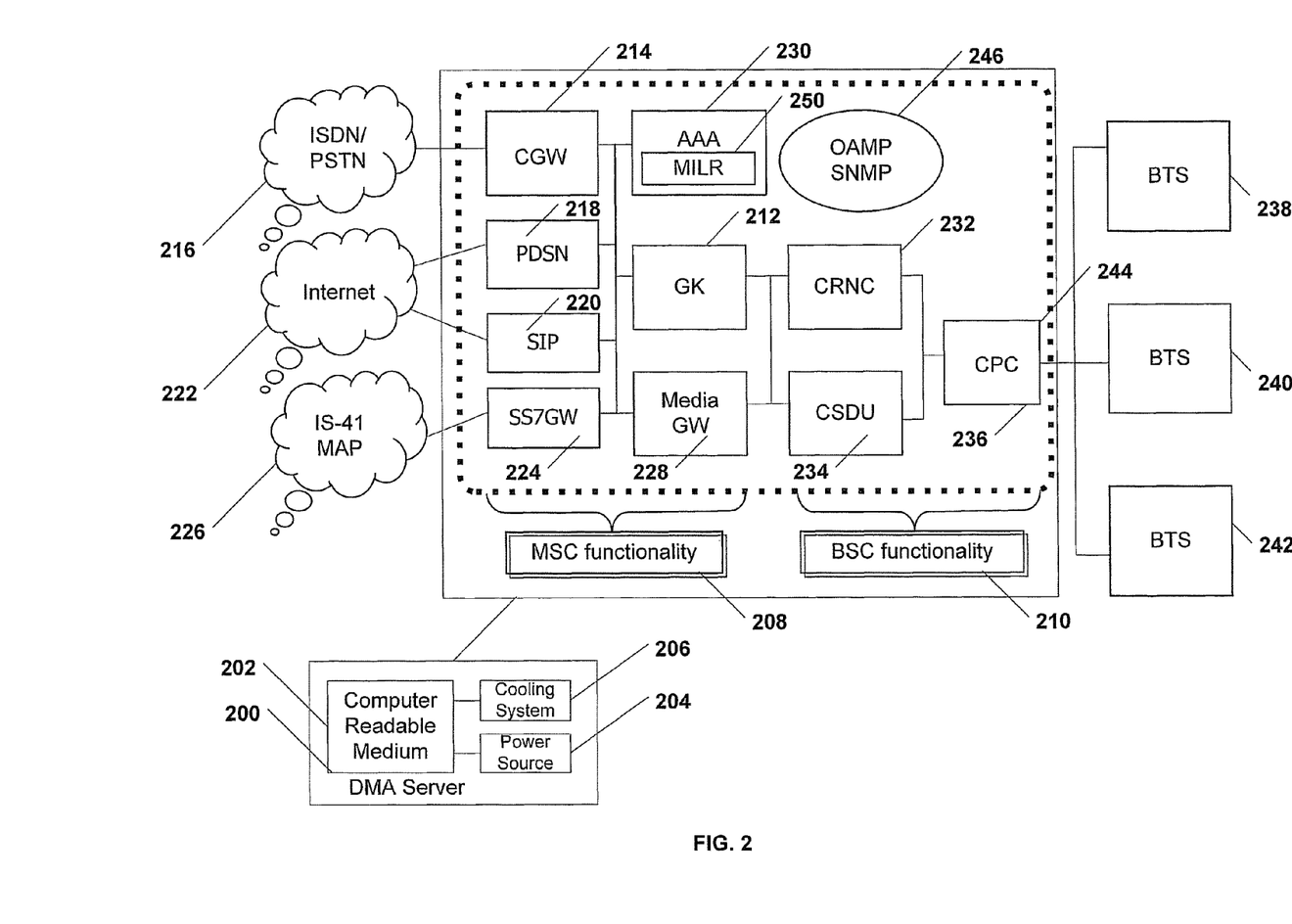
FIG. 2 is a block diagram of a particular illustrative embodiment of a distributed mobile architecture server including an authentication, accounting and authorization (AAA) module with a multiple International Mobile Subscriber Identity (IMSI) location register (MILR) module that may be used as a component of the system of FIG. 1.

FIG. 2 shows an exemplary, non-limiting, embodiment of a distributed mobile architecture server 200, e.g., one or more of the distributed mobile architecture servers described in conjunction with FIG. 1. In a particular embodiment, the distributed mobile architecture server 200 includes a processor, or computer, having a housing and a computer readable medium 202 that is disposed therein. A power supply 204 can also be disposed within the housing of the distributed mobile architecture server 200 in order to provide power to the distributed mobile architecture server 200. The power supply 204 can be a rechargeable battery disposed within the distributed mobile architecture server 200 or the power supply 204 can be external to the distributed mobile architecture server 200, i.e., a standard power outlet. Moreover, a cooling system 206, e.g., a fan with a thermostat, can be within the distributed mobile architecture server 200 in order to keep the distributed mobile architecture server 200 from overheating. In an alternative embodiment, the distributed mobile architecture server 200 can be a single board processor that does not require a fan.

As depicted in FIG. 2, the distributed mobile architecture server 200 includes a mobile switching center (MSC) module 208 and a base station controller (BSC) module 210 embedded within the computer readable medium 202. In an exemplary, non-limiting embodiment, the MSC module 208 can include a gatekeeper (GK) 212 that is connected to several gateways. For example, a circuit gateway (CGW) 214 can be connected to the GK 212 and can provide connectivity to an integrated services digital network/public switched telephone network (ISDN/PSTN) interface 216. The CGW 214 can provide a circuit switched to packet data conversion. In an exemplary, non-limiting embodiment, the PSTN portion of the ISDN/PSTN interface 216 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 216.

As further illustrated in FIG. 2, a packet data server node (PDSN) gateway 218 for CDMA, or a Gateway GPRS Support Node (GGSN) for Global System for Mobile Communication (GSM), and a Session Initiation Protocol (SIP) gateway 220 can also be connected to the GK 212. The PDSN gateway 218 and the SIP gateway 220 can provide connectivity to an Internet protocol (IP) interface 222. Further, the PDSN gateway 218 or a GGSN can establish a reverse tunnel with the PDSN or GGSN gateway 218 using generic routing encapsulation (GRE). Moreover, the PDSN gateway 218, or GGSN, can implement the Pseudo Random Function (PRF)/Foreign Agent (FA) functionality of the distributed mobile architecture 200 which supports mobile IP functions.

FIG. 2 further shows an SS7 gateway 224 that provides connectivity to an ANSI-41 and GSM Mobile Application Part (MAP) interface 226. In a particular embodiment, the ANSI-41 interface can be an SS7 TCAP/SCCP interface on the same SS7 link set used for ISUP signaling. The same SS7 point code can be used to identify the distributed mobile architecture 200 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 2, a media gateway 228 can also be coupled to the GK 212. In an exemplary, non-limiting embodiment, the media gateway 228 can include cellular transcoders, one or more intranet gateways, conferencing bridges, and group calling functionality. Further, an authentication, authorization, and accounting (AAA) module 230 can be coupled to the GK 212. In an exemplary, non-limiting embodiment, there are three levels of authentication management. The highest level is for administration, the mid-level is for operations, and the lowest level is for normal users. The functions of the AAA module 230 can be included in the user level. The AAA module 230 includes a multiple International Mobile Subscriber Identity (IMSI) location register (MILR) module 250. The MILR module 250 includes user information associated with one or more IMSI numbers and one or more MDNs associated with multiple countries. The MILR module 250 also includes active location information related to each mobile subscriber. In a particular embodiment, the MILR module 250 also includes an HLR module, a VLR module, and a CLR module.

In an exemplary, non-limiting embodiment, the GK 212 can act as an AAA server and a feather server to support advanced supplementary service, short message service, etc. Moreover, the GK 212 can act as a call manager and can support ISUP and PSTN function calls. Additionally, the GK 212 can act as a signal gateway, e.g., IP to SS7 inter-working, ISUP, GSM MAP or ANSI-41 to PSTN and ANSI-42/GSM. The GK 212 can also function as a data call server.

As illustrated in FIG. 2, the BSC module 210 includes a cellular radio network controller (CRNC) 232 and a cellular selection/distribution unit (CSDU) 234 that are connected to a call protocol controller (CPC) 236. In turn, the CPC 236 can be connected to a plurality of base transceiver stations (BTSs) 238, 240 and 242. Specifically, the distributed mobile architecture 200 includes a BTS interface 244 at the CPC 236 that can be physically and directly connected to the BTSs 238, 240 and 242. The CRNC 232 can provide cellular radio resource management and cellular call control. The CSDU 234 can provide Fundamental Channel (FCH) soft handoff and distribution, Link Access Control (LAC) processing for inband signaling, multiplexer (MUX) functions, and centralized power control. Further, the CPC 236 can convert a T1 or E1 message or ATM interface to a data packet message. In a particular embodiment, each BTS 238, 240 and 242 supports signals and traffic up to the front point of the CPC 236, e.g., up to the BTS interface 244. Further, in a particular embodiment, the CRNC 232, the CPC 236, the CSDU 234 and the OAMP 246 can perform one or more of the functions of legacy Base Station Controllers (BSC).

In an exemplary, non-limiting embodiment, the BTS interface 244 can be an IS-95A OR IS-2000 interface over E1 or ATM, or the BTS interface 244 can be a GSM BTS interface using MAP or customized application for mobile network enhanced logic (CAMEL). In an illustrative embodiment, the CPC 236 can be connected to one or more BTSs 238, 240 and 242. FIG. 2 further shows that the BSC module 210 includes an operations, administration, maintenance, and provisioning (OAMP) module 246. In an exemplary, non-limiting embodiment, the OAMP module 246 can use simple network management protocol (SNMP) for operations interfaces. Further, the OAMP module 246 can include a JAVA user interface. The OAMP module 246 can also include a software agent that is assigned to each component within the distributed mobile architecture 200. The agents independently monitor their respective components. Moreover, each agent can provision its respective component.

In a particular embodiment, a distributed mobile architecture can be implemented as a system or a device. For example, a distributed mobile architecture system or a distributed mobile architecture device can include a distributed mobile architecture server or a distributed mobile architecture on single processor board.

Figure 3:
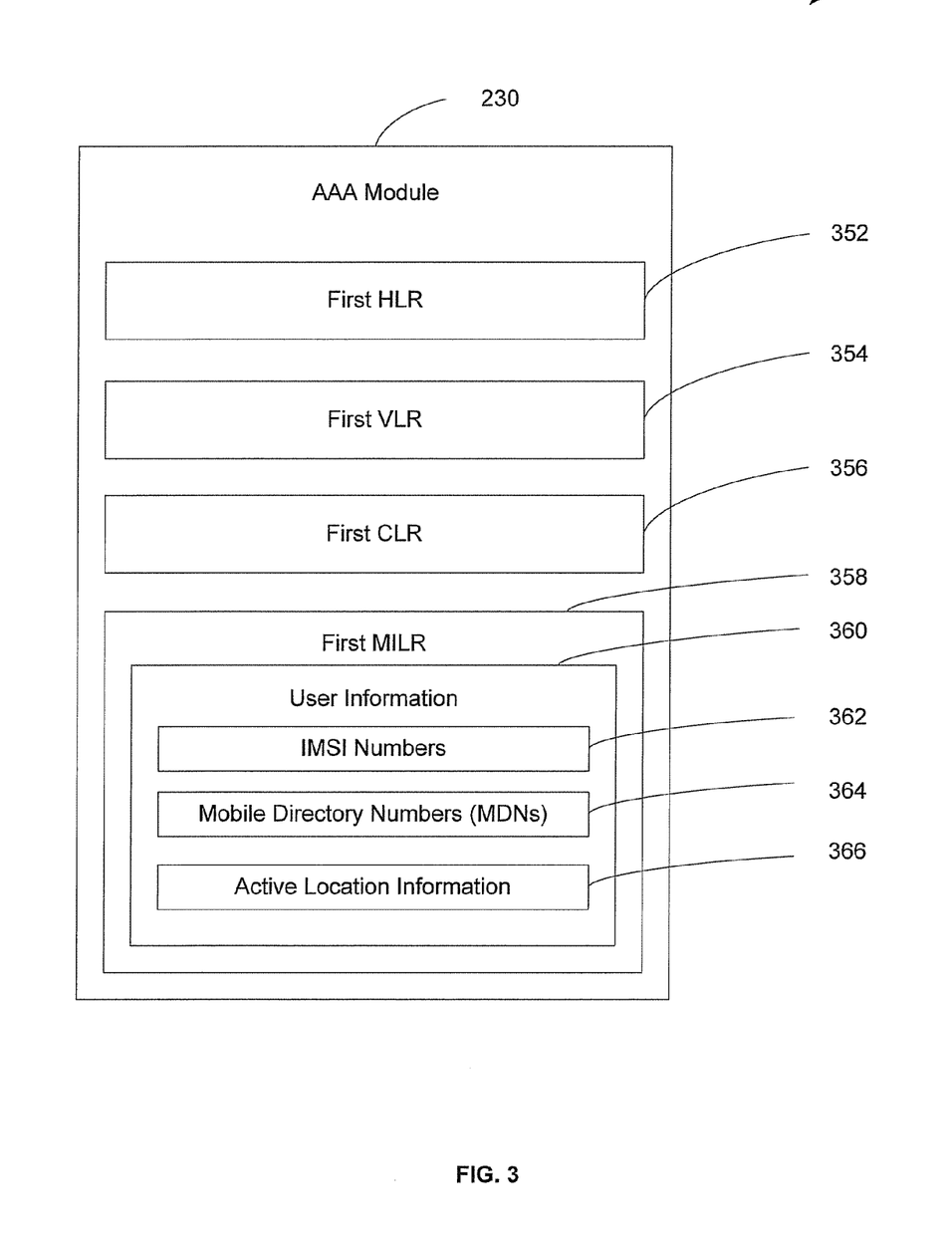
FIG. 3 is a diagram of a particular illustrative embodiment of an AAA module with an MILR module.

Referring to FIG. 3, a particular illustrative embodiment of an authentication authorization and accounting (AAA) module is illustrated at 300. In a particular embodiment, the AAA module is the AAA module 230 of FIG. 2. The AAA module 300 includes a first HLR module 352, a first VLR module 354, and a first CLR module 356. The AAA module 300 also includes a first MILR module 358. The first MILR module 358 includes user information 360 associated with a plurality of mobile subscribers. For each of the mobile subscribers, the user information 360 includes one or more IMSI numbers 362, one or more MDNs 364, and active location information 366 for each mobile subscriber.

In a particular embodiment, the active location information 366 records information related to a current location of a particular mobile subscriber. In a particular embodiment, the one or more IMSI numbers 362 include a first IMSI number and a second IMSI number, and the one or more MDNs 364 include a first representative MDN and a second representative MDN. The first IMSI number and the first MDN are associated with a first country, while the second IMSI number and the second MDN are associated with a second country.

In another particular embodiment, the one or more IMSI numbers 362 also include a third IMSI number and a third MDN, where the third IMSI number and the third MDN are associated with a third country. Thus, the user information 360 may include multiple IMSI numbers and multiple MDNs associated with multiple countries. The IMSI numbers 362 and the MDNs 364 may be stored on a Subscriber Identity Module (SIM) card of a wireless communication device, as described below.

In a particular embodiment, a first set of three digits of the first IMSI number represents a first mobile country code (MCC) associated with the first country. A second set of three digits of the IMSI number represents a first mobile network code (MNC) associated with a first wireless carrier located in the first country. Similarly, a first set of three digits of the second IMSI number represents a second MCC associated with the second country, and the second set of three digits of the second IMSI number represents a second MNC associated with a second wireless carrier located in the second country.

When the mobile subscriber associated with the first MDN is located in the second country, a telephone call to the first MDN received from a caller in the first country is routed to the second MDN via the IP network. In a particular embodiment, the first MDN is a local telephone number in the first country. Thus, the first MDN allows local telephone calls in the first country to be routed to the second country via the IP network without incurring international and similar long distance charges.

Figure 4:
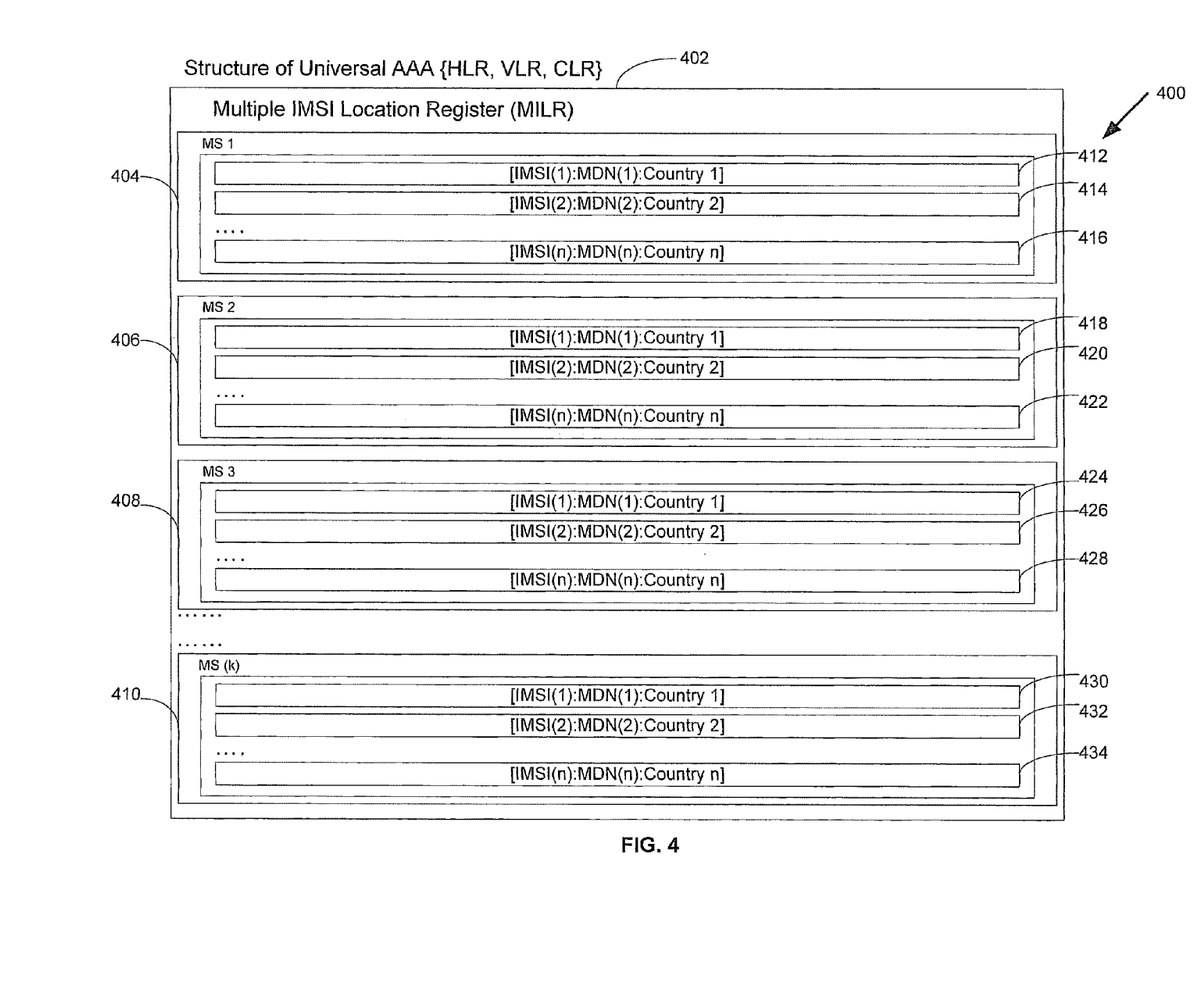
FIG. 4 is a diagram of a particular illustrative embodiment of data stored in an MILR module.

FIG. 4 illustrates a structure of a universal authentication, authorization and accounting (AAA) data store, including a multiple IMSI location register (MILR) 402. In a particular embodiment, the MILR 402 is the MILR 358 of FIG. 3. The MILR 402 includes information associated with a plurality of mobile subscribers, including IMSI numbers, MDNs, and active location information. For example, in the embodiment shown in FIG. 4, the MILR 402 includes information associated with a first mobile subscriber (MS1) 404, a second mobile subscriber (MS2) 406, and a third mobile subscriber (MS3) 408. As shown, the MILR 402 may include information related to additional mobile subscribers, as indicated by information associated with mobile subscriber MSk 410.

In the embodiment shown in FIG. 4, the information associated with the first mobile subscriber 404 includes a first IMSI number and a first MDN associated with a first country, at 412. The information associated with the first mobile subscriber 404 also includes a second IMSI number and a second MDN associated with a second country, at 414. Similarly, the information associated with the second mobile subscriber 406 includes a first IMSI number and a first MDN associated with a first country at 418, and a second IMSI number and a second MDN associated with a second country at 420. Further, the information associated with the third mobile subscriber 408 includes a first IMSI number and a first MDN associated with a first country at 424, and a second IMSI number and a second MDN associated with a second country at 426. The MILR 402 includes information associated with multiple (e.g., k) mobile subscribers, including a first IMSI number and a first MDN associated with a first country at 430, and a second IMSI number and a second MDN associated with a second country at 432.

As shown in FIG. 4, the information associated with the first mobile subscriber 402 may include multiple IMSI numbers and multiple MDNs associated with multiple (e.g., n) countries. For example, information associated with the first mobile subscriber 404 may include IMSI(n) and MDN(n) associated with a particular (n) country, at 416. As a further example, information associated with the second mobile subscriber 406 may include IMSI(n) and MDN(n) associated with a particular (n) country, at 422. Further, information associated with the third mobile subscriber 408 may include IMSI(n) and MDN(n) associated with a particular (n) country, at 428. As noted, the MILR 402 may include information associated with multiple (k) mobile subscribers. The information associated with mobile subscriber (k) 410 may also include IMSI(n) and MDN(n) associated with a particular (n) country, at 434.

Figure 5:
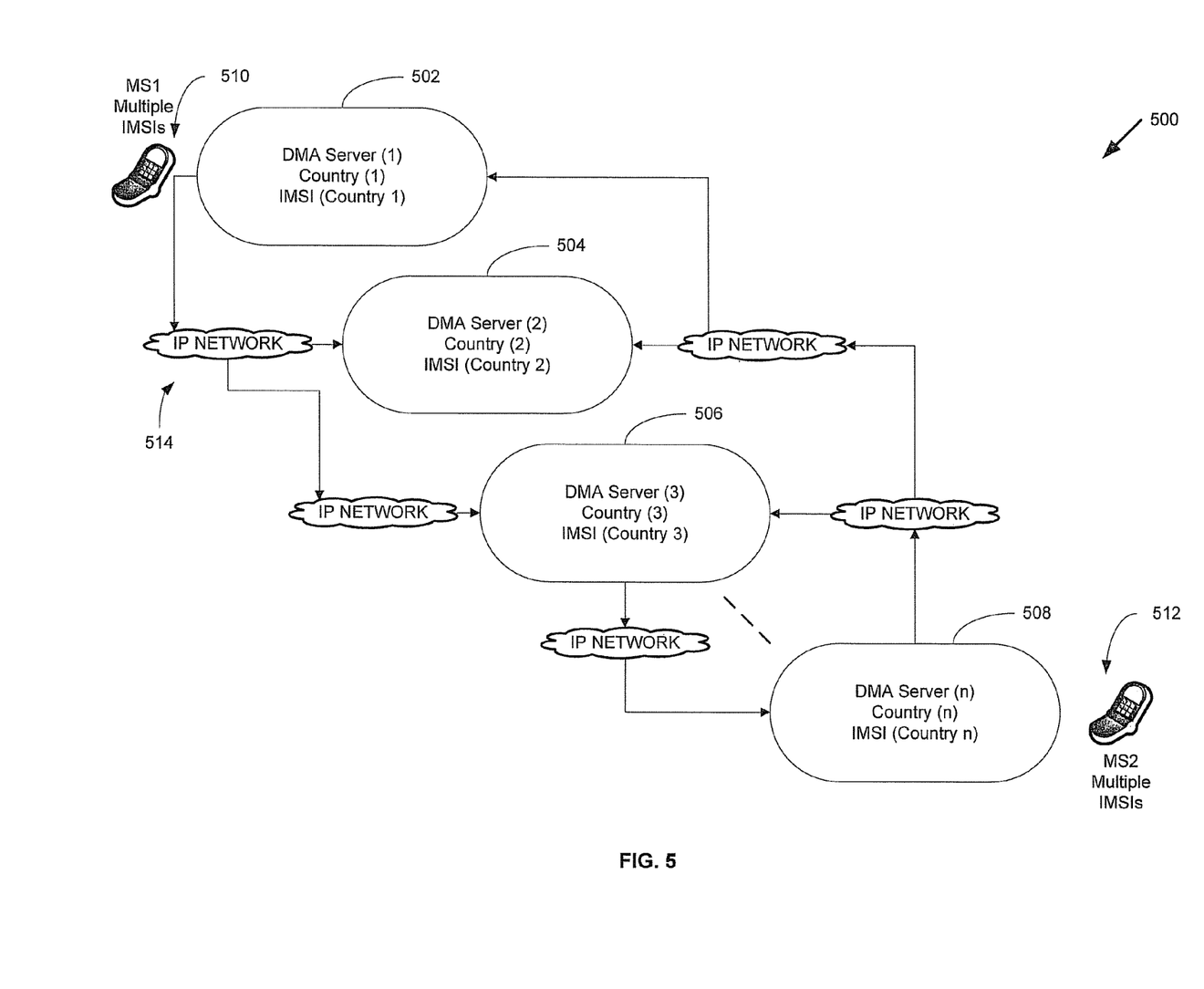
FIG. 5 is a diagram illustrating multiple distributed mobile architecture servers located in multiple countries.

Referring to FIG. 5, multiple distributed mobile architecture servers located in multiple countries are illustrated at 500. For example, a first distributed mobile architecture server 502 may be located in a first country, a second distributed mobile architecture server 504 may be located in a second country, and a third distributed mobile architecture server

506 may be located in a third country. Further, as shown at 508, there may be multiple (n) distributed mobile architecture servers in multiple countries. Each of the distributed mobile architecture servers 502, 504, 506 and 508 may be linked via an IP network 514.

For illustration purposes, a first mobile subscriber 510 may male a telephone call to a second mobile subscriber 512. When the second mobile subscriber 512 is located in the first country, the first distributed mobile architecture server 502 routes the telephone call to the second mobile subscriber 512 based on a first IMSI number associated with the first country. When the second mobile subscriber 512 is located in the second country, the second distributed mobile architecture server 504 routes the telephone call to the second mobile subscriber 512 using a second IMSI number associated with the second country. When the second mobile subscriber 512 is located in the third country, the third distributed mobile architecture server 506 routes the telephone call to the second mobile subscriber 512 using a third IMSI number associated with the third country. Further, when the second mobile subscriber 512 is located in another country (n), the distributed mobile architecture server 508 routes the telephone call to the second mobile subscriber 512 using IMSI(n) associated with that particular country. Thus, the multiple IMSI numbers allow the first mobile subscriber 510 to make a local telephone call to the second mobile subscriber 512 regardless of the location of the second mobile subscriber 512.

As another example, as shown in FIG. 5, both the first mobile subscriber 510 and the second mobile subscriber 512 may use wireless communication devices that include multiple IMSI numbers. Thus, both the first mobile subscriber 510 and the second mobile subscriber 512 may roam between multiple countries and make and receive local calls in the multiple countries. For example, the first mobile subscriber 510 may be located in the second country, and the second mobile subscriber 512 may be located in the third country. In this case, a call made from the first mobile subscriber 510 in the second country would be routed via the second distributed mobile architecture server 504 located in the second country to the second mobile subscriber 512 located in the third country. The second mobile subscriber 512 would receive the call via the third distributed mobile architecture server 506 located in the third country. The telephone call is routed from the second distributed mobile architecture server 504 located in the second country to the third distributed mobile architecture server 506 located in the third country via the IP network 514. For example, the IP network 514 may include a wireless or a wired network.

Figure 6:
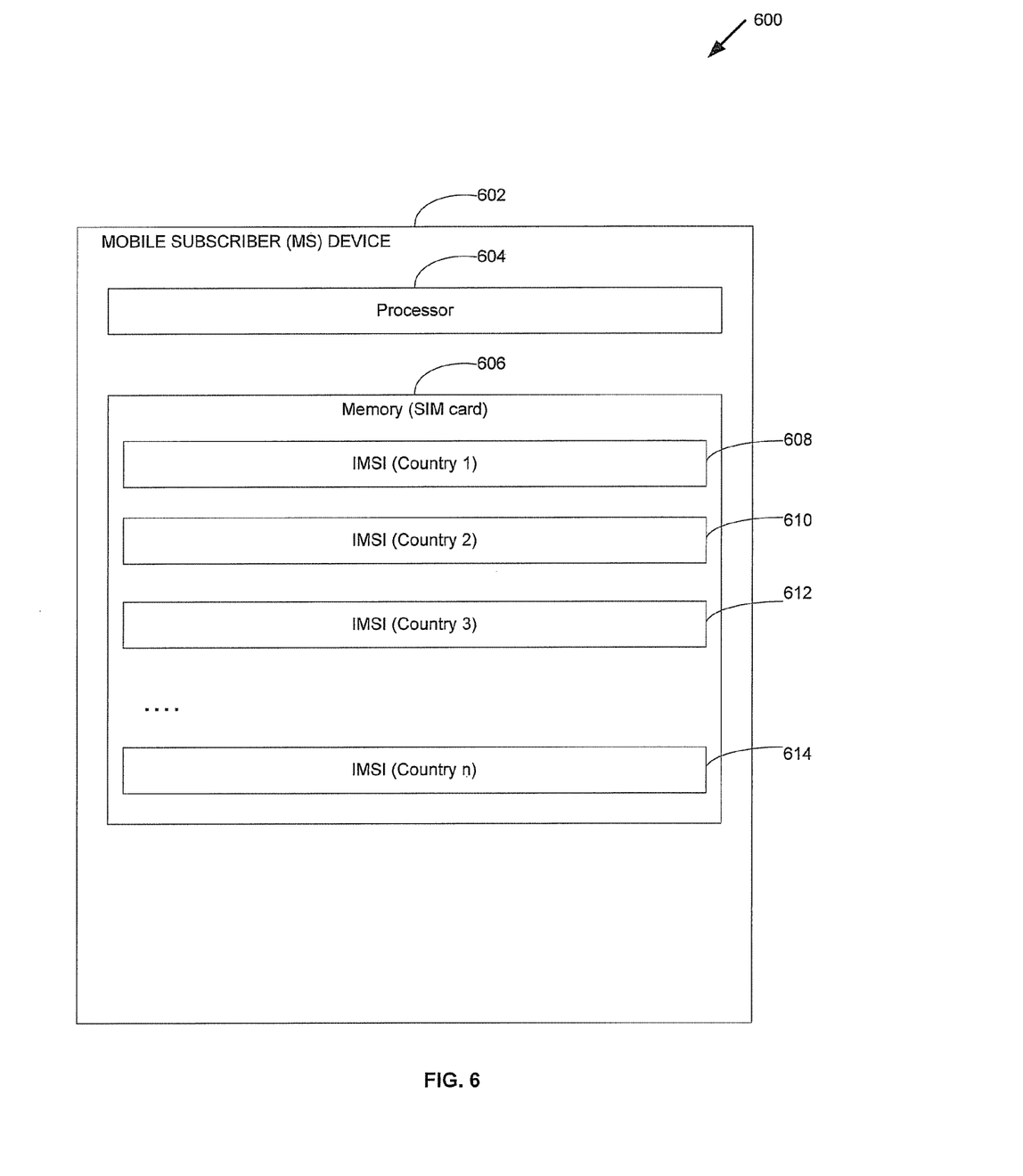
FIG. 6 is a diagram that illustrates a mobile subscriber device including multiple IMSI numbers.

FIG. 6 illustrates a mobile subscriber device 602 that includes multiple IMSI numbers. The mobile subscriber device 602 includes a processor 604 and a memory card 606, such as a Subscriber Identity Module (SIM) card. In the embodiment shown in FIG. 6, the memory card 606 includes a first IMSI number 608 associated with a first country, a second IMSI number 610 associated with a second country, and a third IMSI number 612 associated with a third country. Further, as shown at 614, the memory card 606 may include multiple IMSI numbers associated with multiple (n) countries. When the mobile subscriber device 602 is located in the first country, the first IMSI number 608 is active. Similarly, when the mobile subscriber device 602 is located in the second country, the second IMSI number 610 is active, and when the mobile subscriber device 602 is located in the third country, the third IMSI number 612 is active. Thus, the memory card 606 may enable flat roaming over countries (FroC).

In a particular embodiment, the first IMSI number 608 stored at the memory card 606 includes a first mobile country code (MCC) associated with the first country. In addition, the first IMSI number 608 includes a first mobile network code (MNC) associated with a first wireless carrier located in the first country. The first MCC associated with the first country may be included in a first set of three digits of the first IMSI number 608. The first MNC associated with the first wireless carrier may be included in a second set of three digits of the first IMSI number 608. In another particular embodiment, the second IMSI number 610 includes a second MCC associated with the second country. In addition, the second IMSI number 610 includes a second MNC associated with a second wireless carrier located in the second country. For example, the second MCC may be included in a first set of three digits of the second IMSI number 610. Further, the second MNC associated with the second wireless carrier may be included in a second set of three digits of the second IMSI number 610. Thus, each of the IMSI numbers 608, 610, 612 and 614 may include both a MCC and a MNC associated with a particular country.

When the mobile subscriber device 602 is located in the first country, the first IMSI number 608 is communicated to a first distributed mobile architecture server located in the first country. Thus, when the mobile subscriber device 602 is located in the first country, the first distributed architecture server located in the first country receives active location information via the first IMSI number 608. Similarly, when the mobile subscriber device 602 is located in the second country, the second IMSI number 610 is communicated to a second distributed mobile architecture server located in the second country. Thus, when the mobile subscriber device 602 is located in the second country, the second distributed architecture server located in the second country receives active location information via the second IMSI number 610. Similarly, when the mobile subscriber device 602 is located in the third country, active location information is communicated via the third IMSI number 612, and when the mobile subscriber device 602 is located in country (n), active location information is communicated via IMSI(n) 614.

Figure 7:
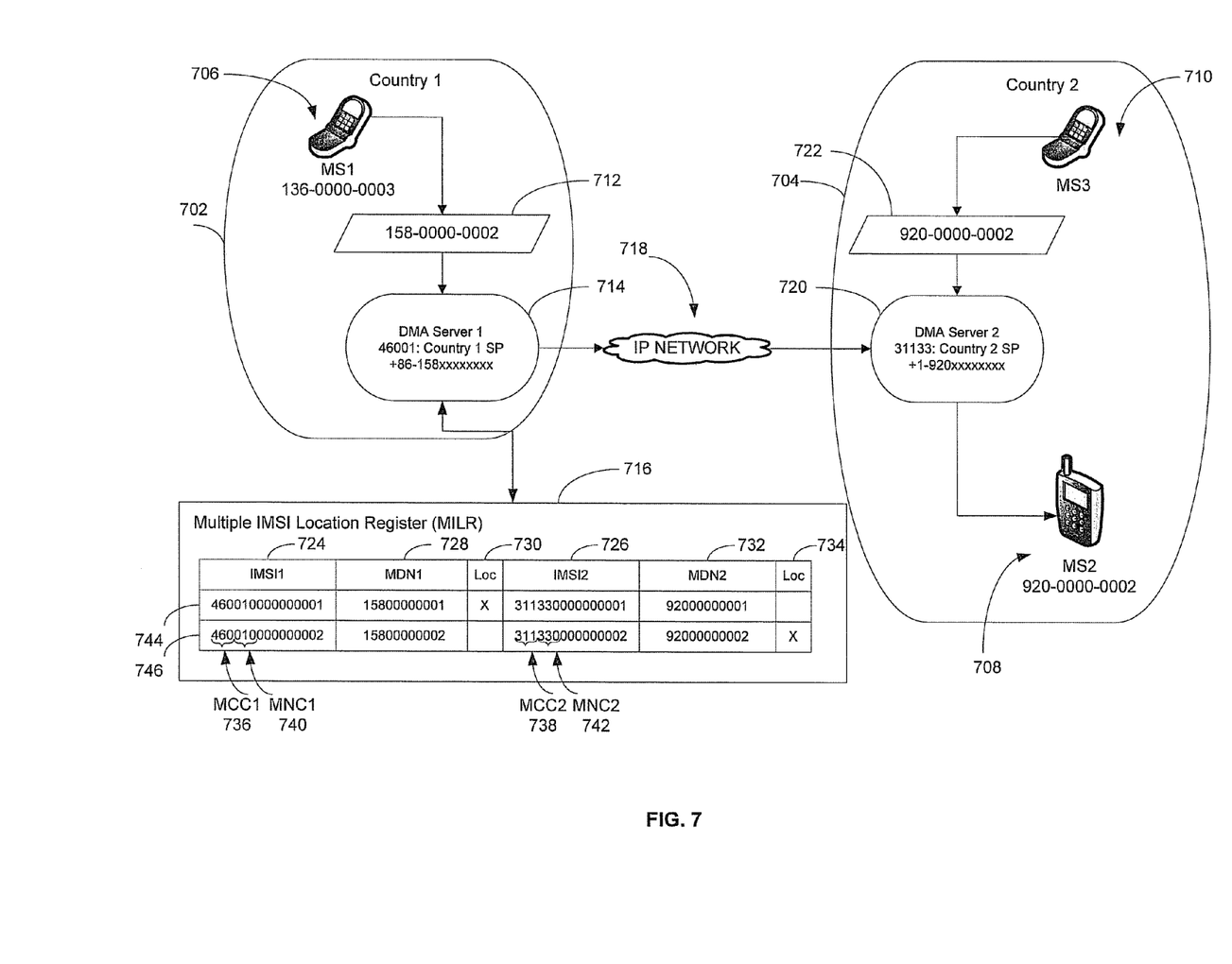
FIG. 7 is a diagram illustrating a system and method of routing telephone calls from a first country to a second country via an Internet Protocol network.

FIG. 7 illustrates a call flow from a first mobile subscriber 706 to a second mobile subscriber 708. The first mobile subscriber 706 is located in a first country 702. The second mobile subscriber 708 is located in a second country 704. The first mobile subscriber 706 places a telephone call to a first Mobile Directory Number (MDN) 712 (e.g., 158-000-0002). The telephone call is routed to a first distributed mobile architecture server 714 located in the first country 702. The first distributed mobile architecture server 714 communicates with a multiple IMSI location register (MILR) 716 to determine an active location of the second mobile subscriber 708.

The MILR 716 includes several IMSI numbers and several MDNs for multiple mobile subscribers. Each IMSI number and MDN are associated with a particular country. For example, the MILR 716 may include a first IMSI number 724 and a first MDN 728 associated with the first country 702. In addition, the MILR 716 may include a second IMSI number 726 and a second MDN 732 associated with the second country 704. In a particular embodiment, the first three digits of the first IMSI number 724 includes a first multiple country code (MCC) 736, and the second three digits of the first IMSI number 724 includes a first mobile network code (MNC) 740. Similarly, the second IMSI number 726 includes a second MCC 738 in the first three digits and a second MNC 742 in the second three digits.

In the embodiment shown in FIG. 7, the MILR 716 includes information 744 for a first mobile subscriber and information 746 for a second mobile subscriber (e.g., the second mobile subscriber 708). When the second mobile subscriber 708 is located in the second country 704 (as in FIG. 7), this active location information is stored in the MILR 716, at 734. For illustration purposes, when the second mobile subscriber 708 is located in the first country 702, this active location information is stored in the MILR 716, at 730.

When the first distributed mobile architecture server 714 communicates with the MILR 716, the active location information determines whether to transmit the call to another distributed mobile architecture server in another country. For example, in the embodiment shown in FIG. 7, the information 746 for the second mobile subscriber 708 indicates that the second mobile subscriber 708 is currently located in the second country (e.g, active location information stored at 734). Thus, based on information retrieved from the MILR 716, the first distributed mobile architecture server 714 determines that the telephone call is to be transmitted to a second distributed mobile architecture server 720 located in the second country 704. The second MDN 732 associated with the second country 704 (e.g., 920-0000-0002) is transmitted to the second distributed mobile architecture server 720 located in the second country 704. The first distributed mobile architecture server 714 communicates with the second distributed mobile architecture server 720 via an IP network 718.

In a particular embodiment, the first MDN 728 associated with the first country 702 (e.g., 158-000-0002) is a local telephone number in the first country 702. Thus, the first mobile subscriber 706 is able to make a local telephone call to the second mobile subscriber 708 even when the second mobile subscriber 708 is located in the second country 704. In another particular embodiment, a third mobile subscriber 710 located in the second country 704 may also make local telephone calls to the second mobile subscriber 708. For example, the third mobile subscriber 710 may make a local telephone call to the second mobile subscriber 708 using the second MDN 732 associated with the second country 704 (e.g., 920-0000-0002). Thus, the second mobile subscriber 708 is able to receive local telephone calls from mobile subscribers in multiple countries while roaming between multiple countries.

Figure 8:
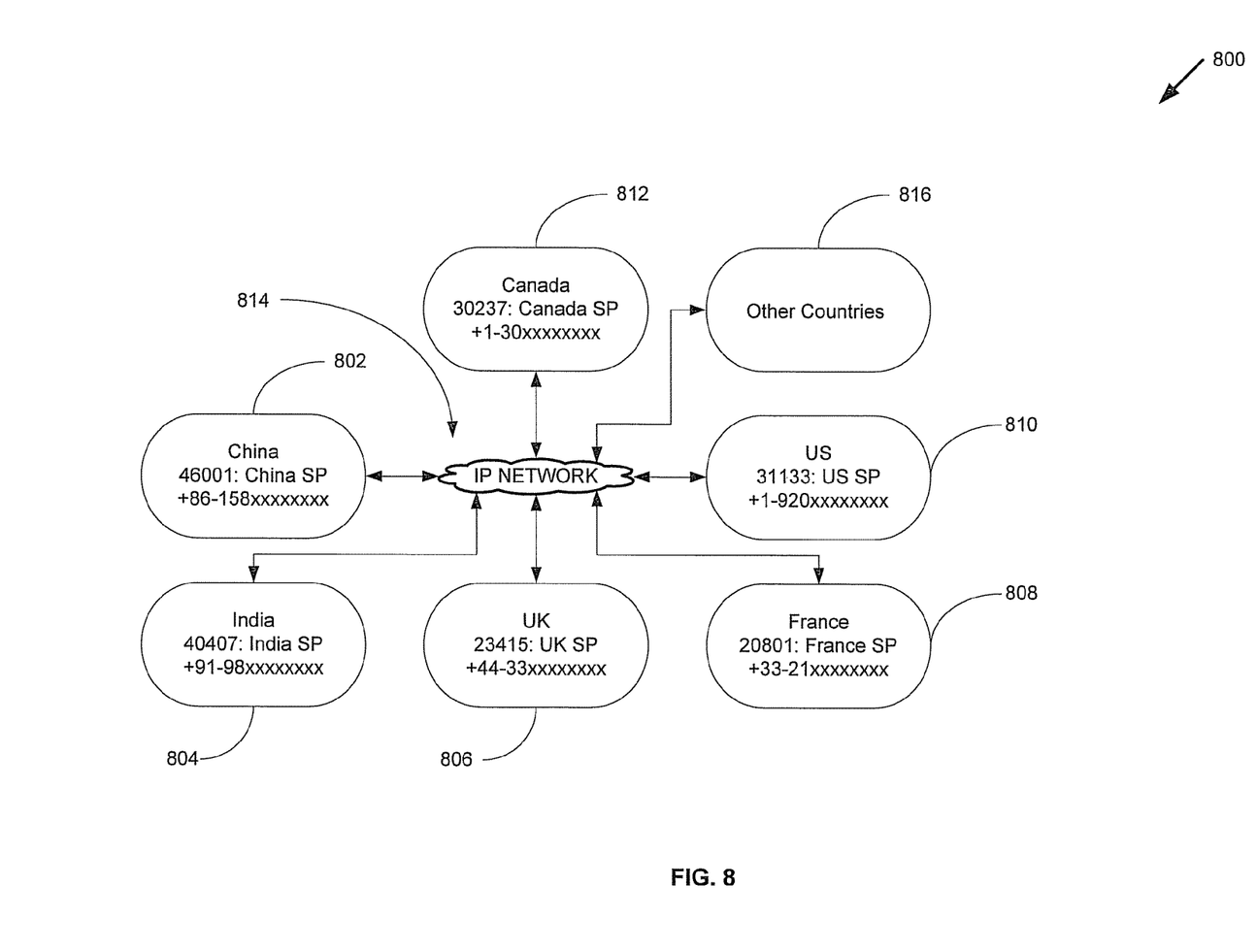
FIG. 8 is a block diagram illustrating multiple distributed mobile architecture servers and multiple service provider networks.

FIG. 8 illustrates that multiple distributed mobile architecture servers may be located in multiple countries, and the multiple distributed mobile architecture servers are linked via an IP network. For example, a distributed mobile architecture server in China 802 may communicate via an IP network 814 with one or more other distributed mobile architecture servers located in other countries. For example, the other distributed mobile architecture servers may be located in India 804, in the United Kingdom 806, in France 808, in the United States 810, in Canada 812, or in other countries 816. It should be understood that the countries listed in FIG. 8 are merely for illustrative purposes only, and any number of countries may be included.

A call from a first mobile subscriber in China may be received at the distributed mobile architecture server 802 located in China. In a particular embodiment, the calls may be local telephone calls to a second mobile subscriber. The local telephone calls are received at the distributed mobile architecture server 802 located in China. The local telephone calls may be routed to one of several countries depending on a location of the second mobile subscriber. For example, the second mobile subscriber may be located in the United States, and a local call made in China may be routed to the distributed mobile architecture server 810 located in the United States via the IP network 814. When the second mobile subscriber is located in the United States, an IMSI number associated with the United States is active. The second IMSI number associated with the United States is communicated to the other distributed mobile architecture servers via the IP network 814. Active location information enables the other distributed mobile architecture servers to track the location of the second mobile subscriber. At any time, the second mobile subscriber may be located in any number of countries. Thus, the active location information is dynamic in nature.

For example, when the second mobile subscriber is located in Canada, an IMSI number associated with Canada is communicated as the active location to the other distributed mobile architecture servers via the IP network 814. For example, the active location information may be communicated to the distributed mobile architecture server 802 located in China. Thus, when the second mobile subscriber is roaming in Canada, the active location information is maintained in the distributed mobile architecture server 802 in China.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
 a first home location register module;
 a first visitor location register module;
 a first community location register module; and
 a first multiple International Mobile Subscriber Identity (IMSI) location register (MILR) module, wherein the first MILR module includes:
  user information associated with a plurality of mobile subscribers, and wherein for each of the plurality of mobile subscribers, the user information includes:
   a first IMSI number and a first Mobile Directory Number (MDN), wherein the first IMSI number and the first MDN are associated with a first country;
   a second IMSI number and a second MDN, wherein the second IMSI number and the second MDN are associated with a second country; and
   active location information,
   wherein when the active location information indicates that a particular mobile subscriber is located in the first country, the first IMSI number is active, the first MDN is an active local telephone number in the first country, and the second MDN is an active local telephone number in the second country, and
   wherein when the active location information indicates that the particular mobile subscriber is located in the second country, the second IMSI number is active, the first MDN is an active local telephone number in the first country, and the second MDN is an active local telephone number in the second country.

2. The system of claim 1, wherein when the particular mobile subscriber is located in the second country, a telephone call to the first MDN from a caller in the first country is routed to the second country via an Internet Protocol (IP) network.

3. The system of claim 1, wherein the first home location register module, the first visitor location register module, the first community location register module, and the first MILR module are stored at a first distributed mobile architecture server located in the first country.

4. The system of claim 3, further comprising a second distributed mobile architecture server located in the second country.

5. The system of claim 4, wherein the second distributed mobile architecture server located in the second country comprises a second MILR module.

6. The system of claim 4, wherein when the particular mobile subscriber is located in the second country, a telephone call to the first MDN from a caller in the first country is routed from the first distributed mobile architecture server to the second distributed mobile architecture server via an IP network.

7. The system of claim 1, wherein the user information further comprises a third IMSI number and a third MDN, wherein the third IMSI number and the third MDN are associated with a third country, and wherein when the active location information indicates that the particular mobile subscriber is located in the third country, the third IMSI number is active, the first MDN is an active local telephone number in the first country, the second MDN is an active local telephone number in the second country, and the third MDN is an active local telephone number in the third country.

8. The system of claim 1, wherein a first set of three digits of the first IMSI number represents a first mobile country code (MCC) associated with a first wireless carrier of the first country.

9. The system of claim 8, wherein a second set of three digits of the first IMSI number represents a first mobile network code (MNC) associated with the first country.

10. The system of claim 1, wherein a first set of three digits of the second IMSI number represents a second mobile country code (MCC) associated with a second wireless carrier of the second country.

11. The system of claim 10, wherein a second set of three digits of the second IMSI number represents a second mobile network code (MNC) associated with the second country.

12. The system of claim 1, wherein when the particular mobile subscriber is located in the first country, a telephone call from the first MDN to a telephone located in the second country is routed from a first distributed mobile architecture server located in the first country to a second distributed mobile architecture server located in the second country via an Internet Protocol (IP) network.

13. The system of claim 1, wherein when the particular mobile subscriber is located in the second country, a telephone call from the second MDN to a telephone located in the first country is routed to a first distributed mobile architecture server located in the first country from a second distributed mobile architecture server located in the second country via an Internet Protocol (IP) network.

14. A method of routing telephone calls from a first country to a second country via an Internet Protocol (IP) network, the method comprising:
  receiving a telephone call to a first Mobile Directory Number (MDN) in a first country;
  determining a location of a mobile subscriber associated with the first MDN and a second MDN,
    wherein when the mobile subscriber is located in the first country, a first International Mobile Subscriber Identity (IMSI) number is active, and
    wherein when the mobile subscriber is located in the second country, a second IMSI number is active, the first MDN is an active local telephone number in the first country, and the second MDN is an active local telephone number in the second country; and
  when the mobile subscriber is located in the second country, routing the telephone call to the second country via the IP network.

15. The method of claim 14, wherein the telephone call is received at a first distributed mobile architecture server located in the first country.

16. The method of claim 15, wherein the telephone call is routed from the first distributed mobile architecture server located in the first country to a second distributed mobile architecture server located in the second country when the mobile subscriber is located in the second country.

17. The method of claim 14, wherein when the mobile subscriber is located in the first country, the first MDN is an active local telephone number in the first country and the second MDN is an active local telephone number in the second country.

18. The method of claim 14, wherein the first IMSI number and the second IMSI number are stored at a Subscriber Identity Module (SIM) card of a device of the mobile subscriber.

19. The method of claim 18, wherein the SIM card further comprises a plurality of IMSI numbers, wherein each of the plurality of IMSI numbers is associated with a particular country.

20. The method of claim 18, wherein the SIM card enables flat roaming over countries (FroC).

21. The method of claim 18, wherein one of the plurality of IMSI numbers is automatically selected based on an active the location of the mobile subscriber.

* * * * *